United States Patent [19]
Gonzalez

[11] 3,809,879
[45] May 7, 1974

[54] MACHINE FOR CREATING AND VIEWING KALEIDOSCOPE IMAGES

[76] Inventor: Hector Gonzalez, 745 Hillcrest Dr., Felton, Calif. 95018

[22] Filed: Nov. 24, 1972

[21] Appl. No.: 309,467

[52] U.S. Cl. .................................. 240/3.1, 350/4
[51] Int. Cl. ............................................ F21p 5/04
[58] Field of Search ...................... 350/4; 240/3.1

[56] References Cited
UNITED STATES PATENTS

| | | | |
|---|---|---|---|
| 1,968,759 | 7/1934 | Gill | 350/4 |
| 3,020,796 | 2/1962 | Kaplan | 350/4 |
| 2,900,867 | 8/1959 | Beatman | 350/4 |
| 3,482,896 | 12/1969 | Bogosian | 350/4 |
| 3,514,178 | 5/1970 | Toney | 350/4 |
| 3,366,786 | 1/1968 | Delano | 350/4 X |

FOREIGN PATENTS OR APPLICATIONS 5,929  7/1906  France ........................ 350/4

*Primary Examiner*—Richard M. Sheer
*Assistant Examiner*—Richard A. Wintercorn

[57] ABSTRACT

Equipment for creating illuminated images in kaleidoscopic form from a miscellany of materials whether arranged at random or geometrically, whether presented statically, continuously changing or intermittently moving, where the subjects are viewed through a mirrored truncated pyramidal tunnel having a wider opening at the viewing end than at the gathering end, where galleries present the objects to be viewed, and in which such objects are directly illuminated, stopped or moved in accordance with the control of the viewer or the operator.

10 Claims, 4 Drawing Figures

PATENTED MAY 7 1974 3,809,879

3,809,879

MACHINE FOR CREATING AND VIEWING KALEIDOSCOPE IMAGES

BRIEF HISTORY OF THE INVENTION

It has been known for a long time that kaleidoscopes were widely used as toys in which images were formed by squinting through a small hole in a darkened tube, and rotating small particles reflected by a series of mirrors under a piece of ground glass. Although it would seem that the number of designs so formed would be infinite in number, nevertheless, any continued use developed a sameness of geometric pattern, after an initial period of enjoyment the attention of the viewer waned. There are several reasons for the very temporary emjoyment of kaleidoscopes. One is that squinting through a tiny hole is not an attitude which can be preserved for any length of time. Also, since there was no control over the image forming characteristics of a kaleidoscope, there was only passive participation by the user. Under such circumstances attention cannot be sustained for any significant period of time.

The prior art has recognized the limitations of a kaleidoscope, and the development has been almost entirely in the effort to control the image forming characteristics, and thus procure some form of active participation. A number of devices have been attempted based upon the hope that a useful purpose such as design and color sequence could attract the designer or the professional colorist if and when control could be attained. As a consequence, the kaleidoscope developed into sophisticated units which are so complicated and costly as to be prohibitive as a toy. However they were still not satisfactory for commercial or other useful application. The emphasis appeared to be in the relm of geometric pattern control and the ability to stop the movement of the color units of a particularly pleasing formation.

With all of this, the need still persisted for a kaleidoscopic device which could be more useful in the control of the designs formed and remain simple in operation, and inexpensive as to cost. These were the necessary requirements for a device which would be available in the toy range and still be effective in the behavioral and educational fields.

The kaleidoscopic structure of the present invention developed from the desire to have fun with light, color and design. In so doing it was unexpectedly discovered that it not only performed kaleidoscopic images but accomplished the image forming control and larger viewing shown by the prior art in a simpler and far better manner. Also unexpectedly, it produced the stimulating response in individuals of all ages and mental attainments, including the mentally retarded. When this was observed, further outstanding results began to appear. There was no failure of effort on behalf of the users regardless of the varying levels of ability, because there was always a fresh, new and beautiful result. There was no limit to the images formed or the products used to form the image, and the result depended only upon the imagination of the user. Because of all of this, there was no less of interest in operating or watching this device, but on the contrary there was a decided urge to continue and do better and more unique image forming. It was further discovered that participation of the user was so easily engendered that it became an educational communication means as well as therapeutic means to stimulate both relaxing and entertaining characteristics.

The device of the present invention not only uses the primitive kaleidoscopic image forming and has enveloped and improved the benefits of the prior art in larger viewing and image control, but has carried on far beyond anything heretofore known, to create a simple and useful instrument for entertainment, for design creation, for education and for therapeutic purposes, amongst others. The interest span of the user has been extended indefinitely due to the individual involvement, and the joy of creation is satisfied in the beautiful results of light, color and texture with no problem of failure regardless of the obtainments or objectives of the users.

If the word kaleidoscope means the image producing of geometric designs then the present invention is not truly a kaleidoscope as it does not produce geometric images. If the word kaleidoscope, however, is defined as some authorities suggest, a variegated changing pattern, then the device is a kaleidoscope because it does produce non-geometric patterns of motion, light and color. The art examined to date without exception produces and is designed to produce geometric forms only. The present invention extends the meaning of kaleidoscope to fulfill the broadest definition. The present instrument is directed to intentional visual disorientation through non-geometric image reflections which promote an optical illusion which is unique. It is believed that the many advantages and unexpected results, including those of viewer reaction may be accredited to the limitless extension for form, color and light produced through non-geometric reflected images.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

DESCRIPTION OF THE PREFERRED FORMS

Figure 1:
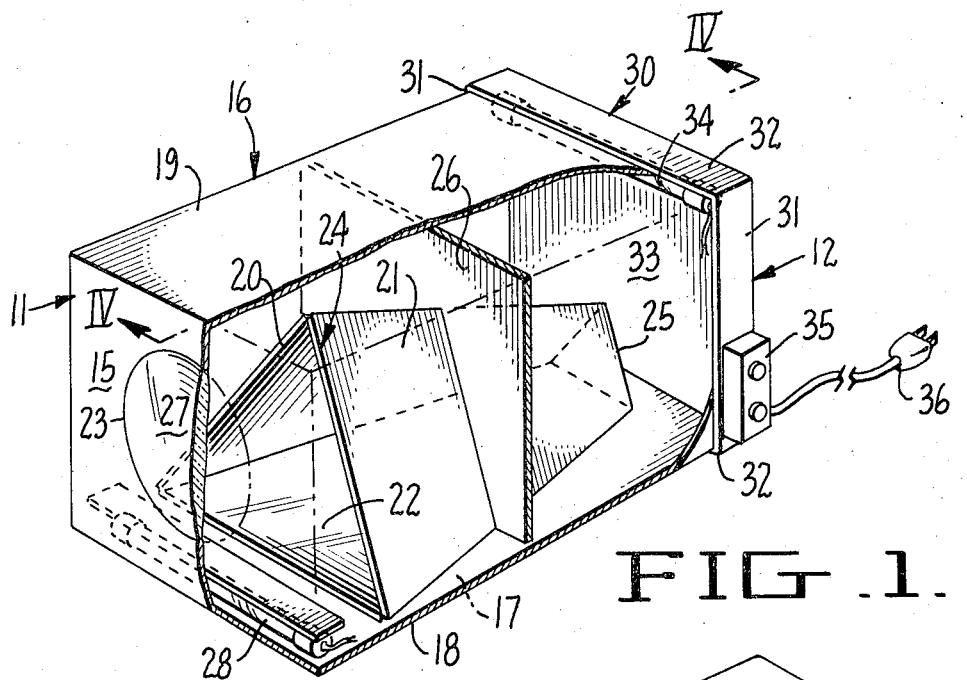
FIG. 1 is a perspective view of the assembled kaleidoscope partially broken away to show the internal structure and arrangement.

Referring now more particularly to the drawings in which like reference numerals refer to the same parts in the several views, and with particular reference to FIG. 1, the equipment itself is generally designated 10. It is constructed in three sections: (1) a cabinet or housing 11, (2) a viewing gallery 12, and (3) an extended viewing gallery 14. The galleries are interchangable depending upon the nature of the use to which the device 10 is being put. It is intended that only one gallery at any one time is in use.

Figure 4:
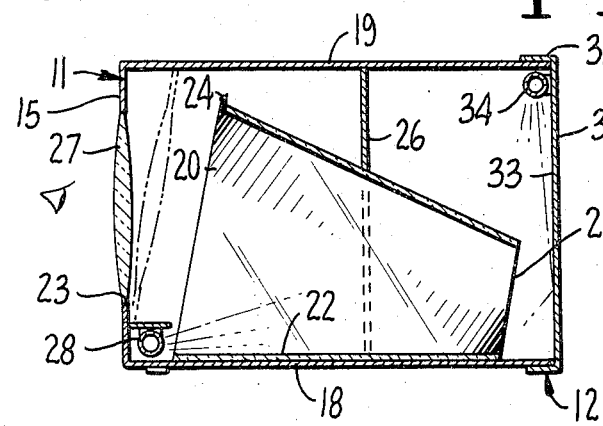
FIG. 4 is a vertical longitudinal section taken on line IV — IV of FIG. 1, with the optional sloping front shown in broken lines.

The cabinet 11, which comprises the first section, may be of any suitable shape and its forward face or end 15 may be slanted as shown in broken lines in FIG. 4, for better viewing purposes. It has two side panels 16 and 17, a top 19 and its bottom 18 is the element upon which all members are secured or attached. The bottom 18 is preferably removably secured to the top portion of the cabinet 11 in any suitable manner and may have low marginal upstanding flanges at both sides and front. The cabinet 11 is open at the far end or the end opposite to the viewing end 15. On the inside of the cabinet 11 there are three equal sized mirrors 20, 21, and 22 arranged in a frusto-pyramidal tunnel-like form. Each mirror in plan is in the shape of a truncated pyramid and all three mirrors 20, 21 and 22 are joined along their marginal edges to form an equilateral tunnel with all mirrors facing inwardly. The equilateral mirrored tunnel is laid on one side, i.e. 22 on the base 18 of the cabinet and secured in this position with the large end 24 adjacent the viewing opening 23 and the small end 25 adjacent the inner end. A baffle 26 is placed at the mid point within the cabinet and straddles the pyramidal tunnel, thus blocking all vision and light beyond and around the same within the cabinet. It is apparent that the baffle 26 contributes to the maintenance of the precise alignment of the mirrored tunnel within the cabinet 11. The tunnel is not required to be three sided but may be multisided as desired. The viewing opening 23 locks directly into the mirrored tunnel towards the small open end 25. The viewing opening 23 may be covered with a wide angle lens 27 for better viewing, or it may be covered with a magnifying lens, or any other image transmitting material which may be desired.

Since lighting is a part of illusion and the image created, the cabinet provides for illumination means mounted on the base 18, but concealed in such a way that it does not interfere with or direct its rays into the lens 27 or other viewing material. In the drawing an ultraviolet tubular light 28 is indicated but it is to be understood that an incandescent or fluorescent light source may be used in its stead or in any combination. The illumination so used will illuminate directly into the open end of the mirrored tunnel.

The viewing gallery 12 is demountably attached to the cabinet 11 and provides a suitable space between the open inner end of the cabinet and the back wall 30 of the gallery. The gallery 12 is box like, composed of a back wall 30 and walls 31, top and bottom walls 32, and a front wall 33 which conforms to the shape of the cabinet 11 and fits therein in light tight engagement. The view into the interior of the gallery 12 through the viewing end 23 of the mirrored tunnel is only through the small end opening 25 of the mirrored tunnel. The gallery is deep enough to mount various kinds of materials on the inner face of the back wall 30 so that they may be viewed in non-geometric kaleidoscopic break-up in the mirrors 20, 21, and 22, through the opening 25. Obviously only a portion of such mountings is available for viewing at any one time.

As in the case of the front portion of the cabinet 11, the viewing gallery 12 contains illumination which is shown in the drawings as an ultraviolet light 34. Obviously this can be a fluorescent or incandescent light source, or any combination of them. As shown in the drawings, the illumination of source 28 is directed to the mirrors 20, 21, and 22 and the illumination 34 is directly on the viewing materials in the gallery 12. Both are connected to switches 35 mounted on the gallery 12 and may be individually activated through a source of electrical power and connector 36.

Figure 2:
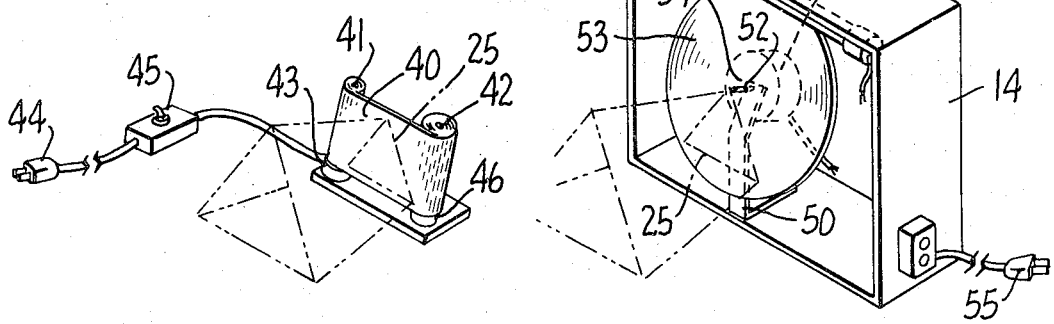
FIG. 2 is a diagrammatic perspective view showing the roller viewing object in relation to the small end of the tube, which is shown in broken lines.
Figure 3:
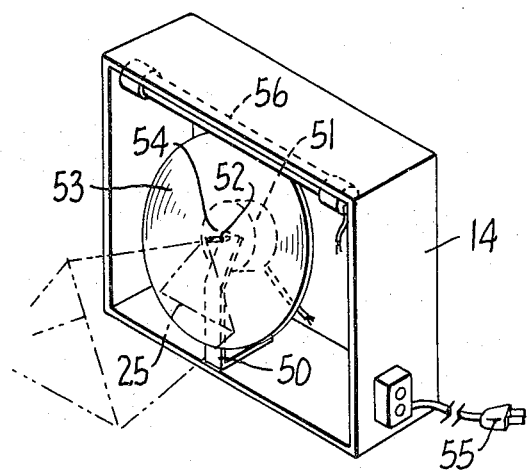
FIG. 3 is a perspective view to the supplemental viewing gallery having a rotating means, with the relationship shown with respect to the small end of the tunnel which is in broken lines.

Instead of a static display arranged within the gallery 12 as described above, the display may be on a tape or strip. This is better shown in FIG. 2 and consists of a continuous strip or tape 40 on which two dimensional objects are established. The tape or strip 40 runs between two spools 41 and 42, which spools are power driven as at 43 by an electrical connection 44 through a stop, go and reverse switch 45. It is apparent that the strip 40 with its decorated surface passes in front of the mirrored opening 25 and by means of switch 45 the tape can be run continuously or intermittently, or stopped all together at any particular point. The strips 40 are wound on spools 41 and 42 and are readily changed and easily stored. By means of a reversing coupling 46 the spools can be rewound or run backwards continuously, intermittently or stopped all together. The illumination from the lamps 34 illuminate the face of the strips directly and so provide the non-geometric necessary light for reflecting within the mirrored tunnel. The strips 40 are wider than the opening 25, so that only the strip is viewed therethrough.

The third portion is a deeper gallery 14 suggested for rotary movement of the viewing objectives. In this gallery which may be detachably secured to the cabinet 11 in place of the gallery 12, there is a central vertical support 50 on which is mounted a motor 51 directly turning the shaft 52 to which may be attached various shapes or discs 53. The gallery 14 is preferably arranged so that the upper limit of the small opening 25 of the mirrored tunnel is below the center 54 of the disc 53, and the primeter thereof is below the lower limits. The rotation of the disc 53 is preferably by the motor 51 although the same can be rotated by hand. The motor 51 should be an all purpose motor so that it can be continuously turning at any controlled rate of speed or intermittently turned, or its motion stopped at any position. It is, of course, connected to a suitable source of power such as that shown at 55. Here again, the gallery 14 contains suitable illumination such as that shown at 56 which as before can be ultraviolet light, fluorescent light or incandescent light or any combination of them. It is apparent that fluorescent parts and materials can be used when ultraviolet lamps are a source of illumination. Any material which is excited to produce a characteristic color by any range of the ultraviolet ray series can be used.

When this machine is in operation, the attention span of the viewer or viewers is increased unexpectedly, probably due to a combination of circumstances. One, is the color and brightness of illuminated surfaces. The second is the change of reflections from either rapid, intermittent or stationary positions, and the truly unexpected effects of the kaleidoscopic reflections in the mirrored tunnel. The equipment has been successfully used in all manner of ways. It has been used by artists and designers for the creation of new and different surface designs, for wall paper, for drawings, for yard goods, and every conceivable product. It has been used by teachers for educational purposes in the creative motivation of students, it stimulates self improvement, develops imagination and offers a means for creative effort. It has been used for therapeutic purposes because it increases the attention span or deficient persons and the absence of any personal failure, it is relaxing and it is a very personal and exciting way of communication.

The portability of the equipment extends its usefulness to any place where there are suitable electrical outlets.

It is to be understood that the triangular shape of the mirrored tunnel is not restrictive but that any multi-sided mirrored tunnel is included, with the knowledge that the greater the number of sides the greater the complexity of the images. Also, it is not necessary to have all of the sides equal in shape or width so long as a light proof tunnel is formed.

I claim:

1. A visual non-geometric image reflecting device, a base with marginal up-standing low walls at the front and sides, an upper cover portion mounted on said base having sides, a top, and a front panel, together with the base forming a housing having an open end at the rear, said front panel having an opening of substantial size therethrough, a frustopyramidal tunnel open at both ends mounted on said base within said housing with the smaller end rearward, the axis of which is tilted downwardly with respect to the longitudinal axis of the housing and having reflecting material on all inner surfaces with all abutting edges joined, a transverse baffle closing the interior of said housing at substantially the median point thereof, for locating and securing said tunnel in position on said base, a concealed light source mounted on said base in front of said tunnel for illuminating the same, a viewing gallery at the open end of said housing removably secured to the open end of said base and closing the open end of said housing, light sources in said viewing gallery for directly illuminating the interior thereof including objects to be viewed in non-geometric reflection, and viewing objects in said gallery.

2. The visual device of claim 1, wherein the opening of said front panel is closed with a viewing glass, where the tunnel is mounted flat on the base portion with the top of the tunnel at its inner end below the vertical mid-point of the viewing gallery and where the viewing gallery is supplied with objects for non-geometric image viewing in the reflecting surfaces of said tunnel.

3. The visual device of claim 1, wherein the reflecting surfaces of the tunnel are mirrors and the light sources for direct illumination are in the ultraviolet range.

4. The visual device of claim 1, wherein the viewing objective for reflective non-geometric viewing in the tunnel surfaces is a continuous horizontal roll having a width greater than the height of the small end of the tunnel and movable in either direction or stopped at any one instant for viewing through the said tunnel.

5. The visual device of claim 1, wherein the viewing objective is a rotating member rotated in a plane substantially parallel to the angular plane of the small end of the tunnel, wherein the center of the rotating member is above the top of the opening of the said small end and adjacent thereto, and means for variably controlling the stopping and rotation of said rotating means.

6. A visual non-geometric image reflecting device, a tray-like base, a cover member mounted on said base having a front panel, sides and a top, leaving the rear end open, said front panel having a large viewing opening therethrough, a three sided frusto-pyramidal tube one side of which is mounted flat on said base within said top portion, with the small end rearward, the axis of which is at an angle of less than 90° with respect to the front panel, said tube having reflecting inner surfaces, a box-like viewing gallery mounted at the open end of said cover and base and closing the same, internal lights in said gallery for directly illuminating the interior thereof, and a concealed light in front of the tube within the top portion for illumination of the interior of said tube from the front.

7. The visual device of claim 6, wherein the gallery is stocked with materials for viewing and the apex of the triangular tube is below the vertical mid-point of the viewing gallery.

8. The visual device of claim 6, wherein a rotating member is mounted within the viewing gallery and directly illuminated by the internal gallery lights, the center of the rotating member being above the apex of said tube, and means for controlled and/or variable rotation of said rotating means for reflective viewing of objects on said rotating member whether in motion or stopped.

9. The visual device of claim 6, wherein the viewing objective is a continuous horizontal band having reflecting objects thereon, and means for driving said band in either direction in a continuous/intermittent controlled speed.

10. The visual device of claim 6, wherein the viewing opening in the front panel of the top portion is closed with a viewing glass and the lights directly illuminating the interiors of the tunnel and the gallery are within the range of 1,000 to 3,000 Angstrom units.

* * * * *